March 11, 1952          W. R. JOHNSON          2,588,730
METHOD AND APPARATUS FOR FREQUENCY
RESPONSE MEASUREMENT Filed May 2, 1947          2 SHEETS—SHEET 1

Inventor
WAYNE R. JOHNSON,
By
Attorney

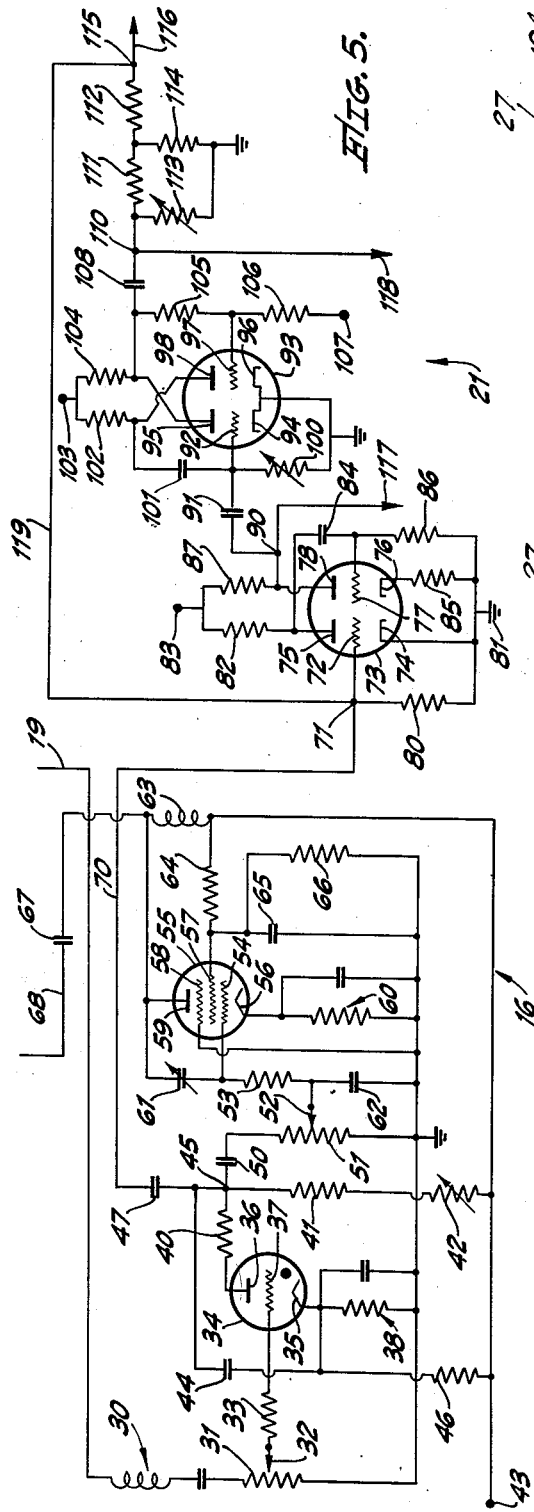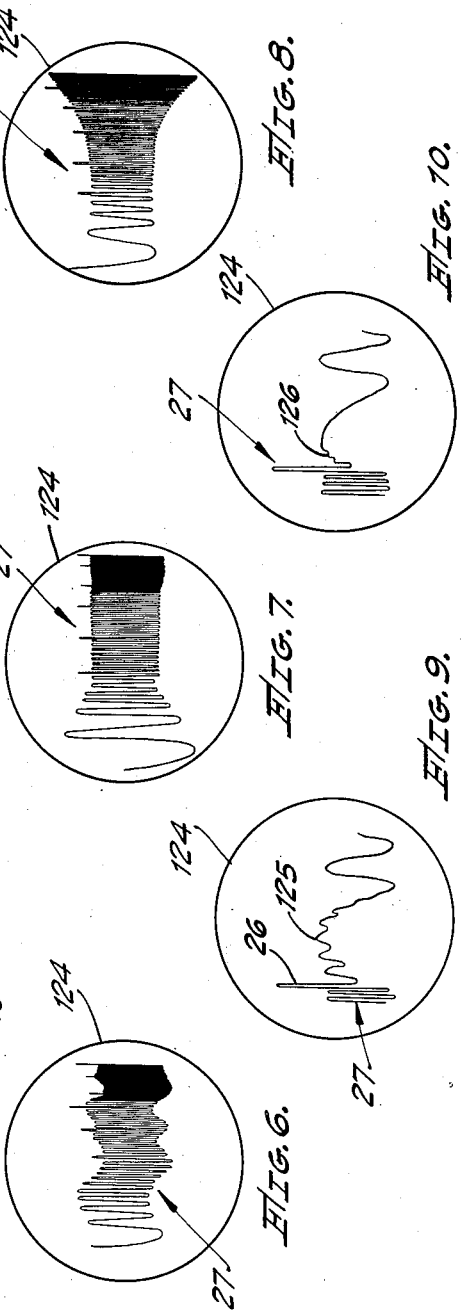

Patented Mar. 11, 1952

2,588,730

UNITED STATES PATENT OFFICE 2,588,730

METHOD AND APPARATUS FOR FREQUENCY RESPONSE MEASUREMENT

Wayne R. Johnson, Los Angeles, Calif.

Application May 2, 1947, Serial No. 745,480

6 Claims. (Cl. 250—27)

My invention relates generally to equipment for electrically detecting, amplifying, transmitting, receiving, and reproducing sound and like signals of near-audio frequency. More particularly, my invention relates to a method and apparatus for measuring and/or recording the frequency response of equipment of the class described.

A customary method used in laboratories and by service technicians for obtaining quantitative measurements of frequency response in a particular piece of apparatus, is to feed into such apparatus a series of signals, each of a discrete frequency and of known amplitude or level. The output signal level of the apparatus under test is measured for each input signal and the result presented in graphic or tabular form. When such information is presented in graphic form it is generally referred to as the frequency response curve for the particular apparatus tested.

Such procedure has a number of disadvantages, the most obvious of which is that it is tedious and time-consuming. For example, to obtain an adequate number of points from which to plot a response curve from an audio amplifier over the normally audible range, requires on the order of twenty separate readings, and if extreme accuracy is required, each reading should be repeated several times.

Another disadvantage following as a corollary to that just mentioned is the fact that in constructing or repairing audio or similar equipment, it is often desired to observe the effect of a change of one of the electronic components of the equipment on the overall frequency response. An accurate overall picture of the frequency response requires that the aforesaid step-by-step procedure be followed. For example, a change in the value of a resistor in an amplifier may correct a deficiency of output in the relatively high frequency range, while at the same time introducing an undesirable response peak in the lower frequencies. This undesirable peaking in the lower frequencies may be obvious from listening to the output of the amplifier, but to obtain a quantitative appraisal, it is necessary to plot or tabulate a new set of output values. Thus, since it is frequently necessary to plot a new response curve each time a slight change is made in the value of some component, the design and development of audio equipment is a somewhat lengthy procedure if conventional testing methods are employed.

Still another disadvantage in the step-by-step method is that, if an accurate and stable result is to be obtained, a relatively expensive signal generator is required; for example, a beat frequency oscillator. This expense can, in some instances, be avoided by the use of standard frequency sound records. Such records, however, have prior to my invention been available only in the forms of either a single continuously varying note, or as a series of step-by-step discrete frequency signals.

As used herein the term "note" designates a single integral audio signal which may be either of a constant frequency throughout its duration or continuously changing in frequency.

One method of frequency response testing which has had limited success in overcoming some of the above difficulties involves the use of a sweep frequency signal generator. Such a generator produces a series of signals, each consisting of a relatively rapidly rising note, such signals being repeated at a rate whereby they may be reproduced visually on an oscilloscope screen to produce a standing pattern. Each of the sweep frequency signals includes all the frequencies over the range which it is desired to test, and the amplitude of all frequencies is either the same throughout the pattern or is changed at a known rate throughout the pattern.

Thus if the signals of such a sweep frequency generator are fed into equipment under test, and the output of the tested equipment is in turn fed into an oscilloscope, the amplitude modulation envelope of the pattern appearing on the oscilloscope screen will be, in fact, a frequency response curve for the equipment being tested.

Without more, however, the sweep frequency generator method produces a largely qualitative result. From the observation of a modulation envelope having no reference points thereon, only a general picture of the overall frequency response can be obtained. Such a pattern, for example, does not show the specific location within the tested range of peaks, dips, or other anomalies in the frequency response.

It is possible, by the addition of a relatively complex timing circuit, to mix with the sweep frequency signals above referred to, a signal comprising a series of marker pulses which appear on the oscilloscope screen and can be used to identify the frequency at various points along the wave pattern. The technique for producing such marker pulses is well known in the art, and is used, for example, in producing "time" or "distance" markers on radar screens.

Testing apparatus as just described which includes not only a sweep frequency generator, but a circuit for producing marker pulses, may be used experimentally in a testing laboratory but is far too cumbersome to be used in routine audio testing and is far too costly to be employed by the ordinary technician or experimenter. Furthermore, because of the nicety of adjustment required to maintain the marker pulses in the proper position on the signal wave pattern, it is likely that much more time would be spent in the laboratory adjusting the equipment that would be saved by avoiding the use of the step-by-step test method. Still further, due to the unavoidable instabilities in electronic components such as resistors, condensers, chokes, vacuum tubes, etc., the composite equipment, once adjusted, would remain in such properly adjusted condition for only a relatively short time, after which readjustment would be necessary.

Bearing in mind the desiderata and difficulties just discussed, it is a major object of my invention to provide a method and apparatus for frequency response measurements which yield quantitative as well as qualitative results.

Another object of my invention is to provide apparatus for conducting tests of the class described which is relatively stable and requires no periodic readjustment.

Still another object of my invention is to provide test equipment as described which is readily portable and within the economic means of ordinary experimenters.

A further object of my invention is to provide testing apparatus which is particularly suitable for testing phonographic reproducers or tone heads.

The foregoing and other objects and advantages of my invention will become apparent from a consideration of the following description of a method and apparatus embodying my invention.

Briefly, my novel method includes the steps of:

Producing a series of rising notes or sweep frequency signals with an adjustable frequency oscillator or similar signal generator, such note including the range of frequencies over which it is desired to obtain response measurements;

Controlling the operation of said generator with a modified "sawtooth generator" so that the rate of frequency increase during one note or signal is logarithmic and so that the repetition rate of the signals is on the order of the sweep rate for visual oscilloscopes;

Producing in a pulse generating circuit a trigger pulse, and a series of marking pulses spaced at predetermined time intervals from the trigger pulse;

Mixing the sweep frequency signals and the pulse signals in such phase relationship that each trigger pulse coincides with the beginning of the sweep frequency signal and the marker pulses fall at various predetermined points along the sweep frequency pattern so as to identify various reference frequencies therein; and Recording the combined output of the mixed signals on a permanent sound record.

The permanent record thus produced may be played through apparatus to be tested and the output of such apparatus fed into a cathode ray oscilloscope. The trigger pulse above referred to serves to trigger the sweep circuit of the oscilloscope so that the successive sweep frequency signals are repeated in the same position on the screen.

It is possible to reproduce the permanent sound record in a wide variety of different sound recording media; for example, magnetically in a steel wire or tape, magnetically in a paper tape coated with ferromagnetic material, photographically in a conventional variable area or a variable density film sound track by engraving in a plastic material, etc. Without meaning to be limited to the particular sound recording method described herein, I prefer at present to record the output of the combined sweep frequency and pulse circuits in a conventional disc phonograph disc record from which duplicate pressings can be made. Thus I provide a relatively inexpensive but accurate piece of test equipment, the cost of which is well within the means of ordinary technicians and experimenters.

Such a pressing may be played with a relatively high quality tone head through equipment under test to obtain an accurate, overall picture of the frequency response without the necessity of reading and plotting a large number of separate measurements.

A record of the type just described has the additional advantage that it can be used to test tone heads themselves, the tone heads under test being used to play the record and the output thereof fed directly into a cathode ray or other type of oscilloscope.

Still another advantage which I have achieved, is that by the use of the record just described the transient response of a piece of audio equipment can readily and quickly be observed. Since the marker pulses used are of extremely high frequency, they can be regarded as the equivalent of a square wave insofar as the transient oscillations produced thereby are concerned. Thus by greatly expanding the sweep rate of the oscilloscope and observing the wave pattern immediately following one of the marker pulses, the transient response of the equipment under test can be seen.

For a more detailed description of the method and apparatus embodying my invention, reference should now be had to the accompanying drawings illustrating a preferred embodiment thereof, in which:

Figure 5 is a circuit diagram of a novel sweep frequency control circuit combined with a pulse generator circuit according to my invention as employed in the arrangement illustrated in Figure 3; and, Figures 6 through 10 illustrate a number of oscilloscope patterns such as are obtained when using a sound record of my invention to test audio equipment.

Figure 1:
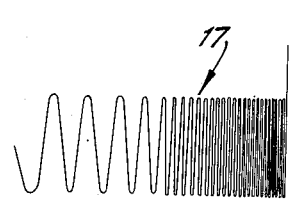
Figure 1 is a graphic representation of a logarithmically increasing sweep frequency signal.
Figure 2:
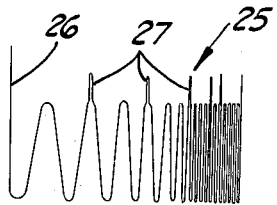
Figure 2 is a graphic representation of the signal shown in Figure 1 with a trigger pulse and a series of marker pulse signals superimposed thereon.

Referring now to the drawings, particularly to Figures 1 and 2 thereof, it will be noted that the low frequencies, i. e., those to the left in Figure 1, are increasing at a relatively slow rate, while the high frequencies to the right in Figure 1 are increasing at a higher rate as the pattern proceeds from left to right. This is accomplished by frequency modulating the output of a conventional beat frequency oscillator 14 over the range of frequencies to be tested (in the present embodiment, approximately ten kilocycles). In order to avoid crowding of the low frequencies, the modulation signal is, as above stated, logarithmic as indicated by the numeral 15 in Figure 3, which identifies a graphic representation of the signal delivered by a sweep control generator 16 to the beat frequency oscillator 14. Thus the signal delivered by the beat frequency oscillator 14 consists of a series of repeated rising notes indicated graphically and identified by the numeral 17 in Figure 3. The notes 17 range from approximately sixty cycles to approximately 10,000 cycles in frequency, and are repeated at a rate of approximately twenty times per second, or just above the visual persistence rate. This produces a standing and non-flickering pattern and does not require the use of persistent-screen oscilloscope tube.

As is well known in the art, beat frequency oscillators are inherently unstable, particularly in the low frequency range. In order to avoid this inherent instability, the sweep control generator 16 is controlled by a small amount of locking voltage picked up from the output of the oscillator and delivered to the sweep control generator through conductor 19 in a manner to be described in more detail hereinafter.

It will be remembered that one of the desirable features of a sweep frequency signal to be used for testing frequency response, is that the signal carried with it, both a triggering pulse for the purpose of synchronizing the oscilloscope, and a number of marker pulses for the purpose of identifying the various frequencies along the wave pattern. In the present instance, such a triggering pulse 20 is initiated by the sweep control generator 16 and fed to a pulse generator 21 which includes multi-vibrator circuits which act in response to the trigger pulse 20 to produce a series of marker pulses such as indicated by the numeral 22. A signal comprising the trigger pulse and the marker pulses is delivered to an amplifier 23 wherein this pulse signal is amplified and inverted as indicated by the numeral 24.

The amplified and inverted pulse signal 24 is fed into a bridge mixing pad 18 wherein it is combined with the sweep frequency signal 17 to produce the composite final signal 25. As will be noted in Figure 3, the composite signal which ultimately is recorded and used to test frequency response, comprises a relatively high amplitude trigger pulse 26 and a series of marker pulses 27 superimposed on the sweep frequency signal 17. This composite signal 25 is adjusted in level by a gain set 28 of conventional design from which it is delivered to a conventional sound recording apparatus (not shown).

The pulses 27 may be placed at any desired point along the wave pattern of the rising signal 17. In the present embodiment, the pulses are placed at positions along the pattern, indicating the frequencies of 1, 3, 5, 7, and 10 kilocycles respectively, reading from left to right in the drawings. As will be noted from an examination of Figure 2, it is desirable that the marker pulses, particularly those in the lower frequency range, fall on the crest of a signal wave. To this end the multi-vibrator circuits in the pulse generator 21 contain adjustable time constant determinant components. This arrangement will be described in more detail hereinafter.

Turning now to a more detailed discussion of the portion of the circuit which includes the sweep control generator 16 and the pulse generator 21, reference should be had to Figure 5.

As previously mentioned, a portion of the output of the beat frequency oscillator is used to trigger or lock-in the sweep control generator 16 so that the resultant pattern appearing on the oscilloscope screen will remain stationary. The connection from the beat frequency oscillator is accomplished through the conductor 19 which leads to a filter 30 which is adapted to pass frequencies in the neighborhood of 10,000 cycles per second. The output of this filter 30 is applied to a variable resistor 31 of which one end is grounded or connected to the other side of the input circuit, while a slider or variable tap 32 is connected through a fixed resistor 33 to the grid or control element 37 of an electron discharge tube 34 of the thyratron type. As is customary, the thyratron 34 is provided with a cathode 35 and a plate or anode 36 in addition to the grid or control element 37. The cathode 35 is connected through a conventional resistor and capacitor connection to ground, while the plate 36 is connected through a fixed resistor 40, a fixed resistor 41, and a variable resistor 42 to a source of positive voltage which is applied at the terminal 43.

A capacitor 44 of relatively large capacity has one of its terminals connected to the junction point 45 of resistors 40 and 41, while the other terminal of the capacitor is connected to the cathode 35. A resistor 46 is connected between the power supply terminal 43 and the cathode 35 to maintain the latter at a predetermined positive potential with respect to ground. The various capacitors and resistors have values selected so that when a signal of a proper frequency is applied to the input connection 19, the filter 30 passes this signal to the grid 37 to trigger the operation of the thyratron 34. It will be noted that one terminal of the capacitor 44 is substantially at ground potential, since the value of resistor 46 is quite small, and the other terminal of the capacitor is connected through resistors 41 and 42 to the positive power connection 43. When the thyratron is non-conductive, the capacitor 44 is charged through resistors 41 and 42 at a rate determined by the values of these resistors. Since the plate 36 is not conducting any current under these conditions, its potential is substantially the same as that of the positive terminal of the capacitor 34, and will increase with it.

It will be understood, of course, that the presence of resistors 41 and 42 causes the voltage at junction 45 to increase exponentially, approaching the voltage of the power supply terminal 43 asymptotically as the capacitor 44 approaches its fully charged condition. However, when the grid 37 is triggered by the input signal, the thyratron 34 becomes conductive and the capacitor 44 is discharged through it, the speed of this discharge being limited only by the protective resistor 40. During the conducting portion of the cycle, the grid 37 has no control on the thyratron 34, but once the plate voltage drops below a certain minimum value, the tube ceases to conduct, and the grid 37 regains control. The cathode 35 is normally maintained at a value slightly positive with respect to ground by the resistor 46, while the grid 37 remains substantially at ground potential or negative with respect to the cathode until such time as an input signal is again passed through the filter 30.

The output of the thyratron 34, as measured at the junction 45, thus consists of an exponentially rising voltage which suddenly drops substantially to zero or ground potential, and then repeats this cycle. By connecting a capacitor 47 to the junction 45, these voltage variations may be transmitted to the pulse generator 21, hereinafter described, as a single pulse occurring once each cycle. This, of course, requires a capacitor of small capacity in order that only the transient or high frequency components of the signal be transmitted.

If a capacitor of greater capacity is used, the lower frequency components or general wave shape of the voltage appearing at terminal 45 will be transmitted therethrough. I make use of this feature to control the operation of a variable impedance tube, which in turn controls the operation of the beat frequency oscillator 14. As indicated in Figure 5, I connect one terminal of a capacitor 50 to the junction 45, the other terminal of the capacitor 50 being connected through a resistor 51 to ground. The resistor 51 is of the type having a variable connection 52, and the latter is connected through a resistor 53 to the control grid 54 of an electron discharge tube 55. The tube 55 is one having a remote cut-off and is preferably a pentode of the type known as a 6AB7/1853. It is to be understood that other suitable types may be used if desired, but I have found the tube mentioned to be very satisfactory. As indicated, this tube includes a cathode 56, a control grid 54, a screen grid 57, a suppressor grid 58, and a plate or anode 59. The cathode 56 is connected through a conventional self-biasing connection 60, consisting of a resistor and capacitor, to ground, while the suppressor grid 58 is connected directly to ground. A small variable capacitor 61 is connected between the control grid 54 and the plate 59 to effect a 90° phase shift between the plate and grid of the tube, while a small fixed capacitor 62 connected between the wiper 52 and ground permits the passage of high frequency transients therethrough which might otherwise interfere with the proper operation of the equipment.

In addition to being connected to the capacitor 61, the plate 59 is connected through a choke coil 63 to the terminal 43 connected to the power supply, while the screen grid 57 is connected through a resistor 64 to the same terminal of power supply. In addition, the screen grid 57 is connected through a capacitor 65 and a resistor 66 to ground so that alternating or transient currents which might otherwise appear at the screen grid will have no effect thereon. To complete the circuit, a small capacitor 67 has one of its terminals connected to the plate 59, while the other terminal is connected to an appropriate terminal on the beat frequency oscillator 14.

It will be apparent to those skilled in the art that the conductor 68 will have a reflected impedance appearing thereon which may vary from capacitive to inductive, depending upon the potential applied to the control grid 54 of the electron discharge tube 55. This reflected impedance may be used to vary the frequency of oscillation of a circuit, and this is precisely what is done in the beat frequency oscillator 14. Such an oscillator, of which there are several well-known types available, includes a fixed oscillator and a variable oscillator whose outputs are combined or "beat" against each other to produce an audio frequency signal. By varying the impedance which controls the frequency of the variable oscillator, the beat or audio frequency output of the device may be controlled. It may be shown that by varying the potential of the grid 54 of the tube 55 from cut-off potential to saturation, the reflected impedance appearing on the conductor 68 will vary logarithmically, and thus I am able to obtain a reflected impedance saw tooth signal 15 which appears in the conductor 68 with the desired logarithmic decrement. In this way, I am able to obtain a signal 17 of varying frequency as shown in Figure 1, but to obtain the greatest advantages from my device, this signal must be provided with a trigger pulse and various marker pulses to indicate the different frequencies. Consequently, I have developed a pulse generator 21 whose circuit is shown in Figure 5.

As previously mentioned, the capacitor 47 has one of its terminals connected to the junction 45 in the output circuit of the thyratron 34, and the other terminal of the capacitor is connected by a conductor 70 to an input terminal 71 of the pulse generator 21. It will be remembered that the signal appearing on the conductor 20 is a single pulse of very short duration, indicated at 20 in Figure 3. This pulse 20 is the triggering pulse which is used to start the sweep of the viewing oscilloscope in a manner hereinafter described, and hence the magnitude or amplitude of this pulse should be quite large. In addition, to indicate the various frequencies, marker pulses should be provided which have a smaller amplitude than that of the triggering pulse 20, so that the sweep circuit of the oscilloscope will not be operated by the marking pulses. Various methods may be used to generate the marker pulses, but since the triggering pulse 20 always appears at the same portion of the cycle, I have found it convenient to use this pulse to control the generation of the marker pulses.

As indicated in Figure 5, the input terminal 71 of the pulse generator 21 is connected to a control element 72 of an electron discharge tube 73, the latter preferably being of the twin triode type such as a 6C8. The first triode section includes a cathode 74, the control element or grid 72, and a plate or anode 75, while the second section includes a cathode 76, a control element or grid 77, and a plate or anode 78. It is to be understood, of course, that while I have shown the electron discharge tube 73 as consisting of a twin triode type, other types may be used and two separate electron discharge tubes may be used instead of the single tube if this should be desirable.

The grid 72 of the first triode section of the tube 73 is connected through a resistor 80 to ground or the other input connection 81, while the cathode 74 is connected directly to ground, thereby providing the desired bias for the grid. The plate 75 is connected through a resistor 82 to a terminal 83 which in turn is connected to the positive terminal of a power supply (not shown) and the plate is also connected through a capacitor 84 to the grid 77 of the second triode section of the electron discharge tube 73. The cathode 76 of this second triode section is connected through a resistor 85 to ground 81, while the grid 77 is also connected through a much higher resistance 86 to ground. To complete the circuit, the plate 78 is connected through a resistor 87 to the positive terminal 83, to provide a circuit which is recognized as a standard two-stage resistance-capacitance coupled amplifier.

The trigger pulse 20 is thus amplified in its passage through the electron discharge tube 73, and this amplified pulse is then used to control a multi-vibrator circuit of more or less conventional design. The multi-vibrator about to be described is adapted to provide a marker pulse at a predetermined point in the sweep of the frequency of the beat frequency oscillator 14, and a separate multi-vibrator is provided for each of the other marker pulses. Since each of the multi-vibrator circuits is identical to the others, only one of the circuits has been illustrated, the one shown being adjusted to provide a marker pulse at 1,000 cycles per second, while the other circuits are adjusted to provide pulses at 3, 5, and 7, kilocycles per second.

In the particular multi-vibrator circuit I have chosen, the plate 78 of the second triode section of the electron discharge tube 73 is connected to a junction point 90 and then through a capacitor 91 to the grid or control element 92 of an electron discharge tube 93, which, like the previously mentioned tube 73, may be of the twin triode type such as a 6N7. As is customary in such tubes, the tube 93 includes two triode sections, the first having a cathode 94, a grid or control element 92, and a plate or anode 95, while the second triode section includes similar elements, Nos. 96, 97, and 98, respectively. The cathodes 94 and 96 are connected together and to ground, and the grid 92 is connected through a variable resistor 100 to ground so that the grid will have the proper bias voltage impressed upon it.

As is customary in multi-vibrator circuits, the grid 92 of the first triode section is connected through a capacitor 101 to the plate 98 of the second triode section; and this latter plate is also connected through a resistor 102 to a terminal 103, which in turn is connected to the positive terminal of a power supply (not shown). The plate 95 of the first triode section is connected through a resistor 104 to the positive terminal 103, while the grid 97 of the second triode section is connected through a resistor 105 to the plate 95 of the first triode section. To complete the circuit, the grid 97 of the second triode section is also connected through a resistor 106 to a terminal 107 which is connected to the negative terminal of a power supply (not shown). It will be understood that the power supply used in connection with this multi-vibrator circuit may be of any conventional type having a sufficient current capacity and provided with terminals which supply a voltage negative with respect to ground, a voltage positive with respect to ground, and a grounded or common return. To provide the desired output voltage from the multi-vibrator, the plate 95 of the first triode section is connected through a capacitor 108 to a junction point 110 where a voltage output of the desired wave shape is secured.

In the operation of the multi-vibrator circuit just described, the amplified voltage of the trigger pulse 26 is applied to the grid 92 of the first triode section so that the previously conducting triode section is rendered non-conductive, while the previously non-conductive triode section is rendered conductive. After a predetermined interval of time, the circuit automatically reverses the conductive and non-conductive triode sections thereby producing a substantially square, but non-symmetrical voltage output wave form. A detailed analysis of the operation of such a multi-vibrator circuit may be found in many standard test books, and will not be repeated here, but it may be shown that by varying the variable resistor 100, it is possible to control the relative time, between trigger pulses 26, when the conducting and non-conducting characteristics of the twin triode sections of the electron discharge tube 93 are reversed. The capacitor 108 acts, in effect, to change the square wave output of the multi-vibrator circuit to a series of oppositely directed pulses, the first pulse, corresponding to the trigger pulse 26, appearing at the junction point 110 as a pulse of opposite polarity from the original trigger pulse. The second or marker pulse, corresponding to the second reversal of the triode section conducting characteristics will appear as a pulse having the opposite polarity of the first pulse, and consequently having the same pulse as the original trigger pulse 26. The variable resistor 100 is adjusted so that the first marker pulse just described occurs at the 1,000 cycle per second point on the sweep frequency signal.

By connecting other multi-vibrator circuits to the junction points 90 and 110, as indicated by the conductors 117 and 118, respectively, marker pulses may be provided at 3, 5, and 7 kilocycle frequencies. Since each of these multi-vibrator circuits is identical with the one just described, it is felt that a detailed description of their construction and operation is not necessary. In each case, the variable resistor 100 is adjusted to provide a marker pulse at the desired point on the sweep frequency signal, and the accuracy of this adjustment may be checked by any suitable equipment well known to those skilled in the art.

To enable the operator to adjust the magnitude or amplitude of all of the pulse markers 27 simultaneously, I provide a variable attenuator circuit including a pair of fixed resistors 111 and 112, connected in series, with a variable resistor 113 connected between junction point 110 and ground, and with a fixed resistor 114 connected between resistors 111 and 112, and ground.

To complete the circuit of the pulse generator 21, a conductor 119 is connected between the junction point 71 and a junction point 115, at the output end of resistor 112, to conduct the trigger pulse 26 to the junction point where it will effectively counteract the first pulse of each of the multi-vibrator circuits, the trigger pulse being somewhat reduced in magnitude in so doing, but leaving the remaining marker pulses 27 unaffected. From junction point 115, a connection is made by conductor 116 to the pulse amplifier 23 which may be an amplifier of any suitable conventional design which amplifies or increases the magnitude of the trigger and marker pulses 26 and 27, and also reverses their polarity, as indicated by the diagrams 22 and 24 of the input and output voltages of the pulse amplifier. From the pulse amplifier 23, the amplified pulse signals are transmitted to a bridge mixing pad 18 which likewise may be of a conventional design adapted to receive two separate input signals which may be mixed or combined in varying proportions, the signal appearing in one input circuit having no effect upon the other input circuit. From the bridge mixing pad 18 the combined output is transmitted to a gain set 28 which may be of any suitable type of attenuator control, adjustable to provide any desired amplitude of final output signal.

Figure 3:
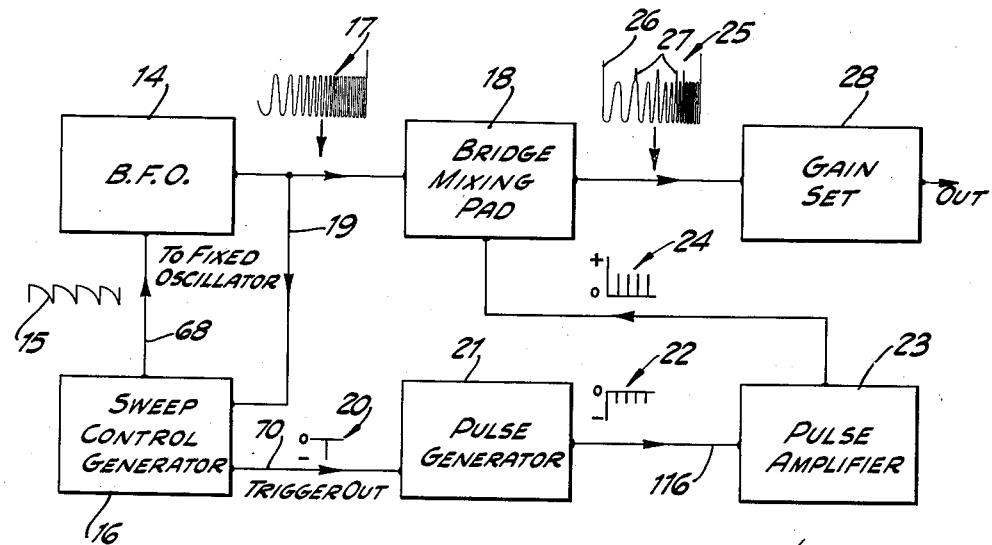
Figure 3 is a block diagram illustrating the apparatus and connections employed to produce the signal illustrated in Figure 2.
Figure 4:
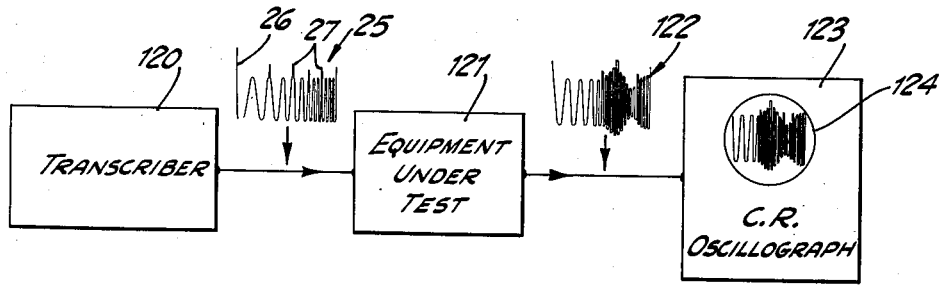
Figure 4 is a block diagram illustrating the use of a sound record produced in accordance with my invention being used to test a piece of audio equipment.

The sound record produced by the apparatus illustrated in Figure 3 may be used to test the frequency response of a wide variety of different types of electronic equipment. One convenient arrangement for performing such tests is illustrated in Figure 4 wherein the record containing the repeated sweep frequency signal illustrated in Figure 2 is reproduced on a transcriber 20. The output of the transcriber is illustrated graphically by the signal 25, which is delivered to a piece of equipment 121 under test. The output signal 122 of the tested equipment 121 is fed to a cathode ray oscilloscope 123 wherein the wave pattern appears on the screen 124. The amplitude modulating envelope of the wave pattern 122 is, as has been stated, the frequency response curve of the tested equipment 121. Thus it can be seen in the illustrated case that between 60 and 1,000 cycles, the frequency responsive equipment 121 is relatively flat. Between 1,000 and 3,000 cycles, the frequency response rises; between 3,000 and approximately 6,000 cycles the frequency drops, and from 6,000 to 10,000, it again rises to approximately normal level. By simple measurement of the pattern as it appears on the oscilloscope screen 124 using methods well known in the art, the actual decibel levels of the output signal 122 can be determined at any point along the frequency range.

Figures 6, 7 and 8 illustrate other non-linear frequency response patterns such as have been observed by the use of test records embodying my invention. Figure 6 is of particular interest as illustrating the type of output produced by imposing a relatively low frequency mechanical vibration on phonographic apparatus under test.

Figure 7 illustrates the appearance of an output curve having a relatively high response to low frequencies, being relatively flat in the middle frequencies with a slight rise in response at the high frequencies. Figure 8 illustrates the output of equipment having a rising frequency response.

Since the duration of the synchronizing and marking pulse is approximately 200 microseconds, its effect on audio circuits is substantially that of a square wave. Thus the synchronizing and marking pulses in addition to serving the purpose hereinbefore described, may also serve to check the transient response of the equipment under test.

Figures 9 and 10 illustrate the use of records embodying my invention for testing transient response. If the cathode ray oscilloscope 124 used in connection with the test is so adjusted as to greatly expand the sweep rate, then pulse signals 27 will appear to be greatly magnified on the pattern as illustrated in Figure 9. The portion of the wave pattern immediately following the pulse 27 can then be examined to determine if the transient effect of the pulse is, or is not producing harmful or undesirable oscillation. In Figure 9 a pattern indicating relatively high transient distortion is indicated by the numeral 125. In Figure 10 relatively low transient distortion is indicated by the numeral 126.

As was stated earlier herein, it is necessary for accurate measurement that the amplitude of the sweep frequency signal fed into the equipment under test be uniform throughout the frequency range. In order that this shall be true, it may in some instances be necessary to deliberately distort the amplitude modulation envelope of the signal as it is recorded in order to compensate for the normal alinear characteristics of the particular sound recording medium and transcription equipment used. For example, the response of an ordinary undulating groove sound record falls off as the frequency increases. Thus if the signal delivered by a test record of this type embodying my invention is to be of uniform amplitude, it is necessary that the sweep frequency signal be recorded with an increasing amplitude as well as an increasing frequency. The technique for recording sound in a manner to produce faithful reproduction of amplitudes throughout a predetermined frequency range is sometimes referred to as "orthacoustic" recording, and such techniques being well known in the art, are not described in detail herein.

While I have found by experiment that a wide variety of recording media are suitable for producing the sound record embodying my invention, I prefer to employ the conventional disc records of the constant radial velocity type such as may be played at 78 R. P. M. or in some cases, records designed to be played at 33⅓ R. P. M.

In carrying out my invention, I record the combined sweep frequency signals and pulse signals by engraving a master disc from which pressings may be made in the conventional manner. In order that the pressings will produce a signal with a flat amplitude envelope throughout the range of frequencies recorded, I sometimes deliberately introduce alinear response elements into the gain set 26 illustrated in Figure 3 or elsewhere in the circuit so as to produce an amplitude envelope of the recorded signal which varies according to the standard curve established by the National Association of Broadcasters as that giving a substantially flat frequency response for conventional disc transcriptions.

It should be noted that one important advantage to be gained by testing audio equipment by the method described herein lies in the fact that, once recorded, the identity of the repeated notes remains uniform and the relative phase relation of the signal, marker pulses, and trigger pulses is fixed. This uniformity and unvarying time standard is due to the fact that the modulations in the sound track of the recording medium, are permanent in shape and fixed in their relative positions.

While the method and apparatus shown and described herein is fully capable of achieving the objects and providing the advantages hereinbefore stated, it is capable of considerable modification within the spirit of the invention. For this reason I do not mean to be limited to the specific forms, circuit arrangements, and constants herein described, but rather to the scope of the appended claims.

I claim:

1. In apparatus for producing a test record of the class described: a variable frequency signal generator adapted to produce signals of predetermined amplitude; frequency control means operatively associated with said generator and adapted to progressively vary said signal frequency at a predetermined rate over a predetermined frequency range; sweep circuit means connected to the output of said generator and controlled thereby, and connected to said frequency control means whereby to terminate and re-initiate the operation of said sweep circuit means at regular intervals whereby to produce a series of identical swept-frequency signals from said generator; and pulse generating means connected to said sweep circuit means to produce a pulse at the beginning of each of said signals, said pulse being of greater amplitude than that of said signal.

2. In apparatus for producing a test record of the class described: a variable frequency signal generator adapted to produce signals of predetermined amplitude; frequency control means operatively associated with said generator and adapted to progressively vary said signal frequency at a predetermined rate over a predetermined frequency range; sweep circuit means responsive to the output of said generator and operatively connected to said frequency control means whereby to terminate and re-initiate the operation of said sweep circuit means at regular intervals whereby to produce a series of identical swept frequency signals from said generator; triggering pulse generating means responsive to said sweep circuit means and adapted to produce a triggering pulse at the beginning of each of said signals, said triggering pulse being of greater amplitude than that of said signal; and marker pulse generating means responsive to said trigger pulse means and adapted to superimpose on said signals at predetermined points therein, marker pulses of amplitude greater than that of said signal but less than that of said trigger pulses.

3. In apparatus for producing a test record of the class described: a variable frequency signal generator; frequency control means operatively associated with said generator and adapted to progressively vary said signal frequency at a predetermined rate over a predetermined frequency range; sweep circuit means responsive to the output of said generator and operatively connected to said frequency control means whereby to terminate and re-initiate the operation of said sweep circuit at regular intervals whereby to produce a series of identical swept-frequency signals from said generator; trigger pulse generating means responsive to said sweep circuit means and adapted to produce a pulse substantially simultaneously with each said re-initiation of said signals; marker pulse generating means responsive to said trigger pulse means adapted to produce a plurality of marker pulses at predetermined times after said trigger pulse, said marker pulses having less amplitude than said trigger pulses; means to amplify said pulses to amplitudes greater than that of said signal; and means to mix said pulses and signals whereby to produce a series of composite signals each having an initial pulse of predetermined amplitude, a wave pattern of constantly changing frequency and of amplitude less than that of said initial pulse, and a plurality of marker pulses occurring at predetermined frequency points in said wave pattern.

4. In apparatus for producing a test record of the class described: a variable frequency signal generator; frequency control means operatively associated with said generator and adapted to progressively vary said signal frequency over a predetermined frequency range; sweep circuit means connected to the output of said generator and controlled thereby, and connected to said frequency control means whereby to terminate and re-initiate the operation of said sweep circuit at regular intervals whereby to produce a series of identical swept-frequency signals from said generator; and capacitor means in said sweep circuit means to vary the rate of change effected by said frequency control means whereby said signal frequency is varied exponentially.

5. In apparatus for producing a test record of the class described: a variable frequency signal generator; frequency control means operatively associated with said generator and adapted to progressively vary said signal frequency at a predetermined rate over a predetermined frequency range; and sweep circuit means including an element responsive to a predetermined frequency connected between the output of said generator and said frequency control means to terminate and re-initiate the operation of said sweep circuit whenever said signal frequency reaches a predetermined value whereby to produce a series of identical swept frequency signals from said generator.

6. In apparatus for producing a test record of the class described: a variable frequency signal generator; frequency control means operatively associated with said generator and adapted to progressively vary said signal frequency at a predetermined rate over a predetermined frequency range; and sweep circuit means including a reactive element selectively responsive to a predetermined frequency connected between the output of said generator and said frequency control means to terminate and re-initiate the operation of said sweep circuit whenever said signal frequency reaches a predetermined value whereby to produce a series of identical swept frequency signals from said generator.

WAYNE R. JOHNSON.

REFERENCES CITED

The following references are of record in the file of this patent:

UNITED STATES PATENTS

| Number | Name | Date |
| --- | --- | --- |
| 1,661,751 | Fletcher | Mar. 6, 1928 |
| 1,792,528 | Bleyer | Feb. 17, 1931 |
| 1,961,367 | Kuhn | June 5, 1934 |
| 2,031,605 | Jenkins et al. | Feb. 25, 1936 |
| 2,106,350 | Hickman et al. | Jan. 25, 1938 |
| 2,110,090 | Ligh et al. | Mar. 1, 1938 |
| 2,142,591 | Ross | Jan. 3, 1939 |
| 2,144,844 | Hickman | Jan. 24, 1939 |
| 2,178,347 | Piety | Oct. 31, 1939 |
| 2,203,750 | Sherman | June 11, 1940 |
| 2,243,234 | Von Duhn | May 27, 1941 |
| 2,250,104 | Morrison | July 22, 1941 |
| 2,285,038 | Loughlin | June 2, 1942 |
| 2,296,919 | Goldstine | Sept. 29, 1942 |
| 2,304,633 | Farnsworth | Dec. 8, 1942 |
| 2,315,377 | Poch | Mar. 30, 1943 |
| 2,373,275 | Thomas | Apr. 10, 1945 |
| 2,378,388 | Begun | June 19, 1945 |
| 2,403,982 | Koenig, Jr. | July 16, 1946 |
| 2,403,986 | Lacy | July 16, 1946 |
| 2,419,569 | Labin | Apr. 29, 1947 |
| 2,474,278 | Ranger | June 28, 1949 |

OTHER REFERENCES

Bartholomew: Acoustics of Music, pages 21–26, Prentice-Hall, copyright 1942, copy in Division 69.